UNITED STATES PATENT OFFICE.

JOHN H. BROWN AND JOEL G. WHITESIDE, OF ST. LOUIS, MISSOURI.

IMPROVEMENT IN COMPOSITION DRESSING FOR SHOES, &c.

Specification forming part of Letters Patent No. 168,220, dated September 28, 1875; application filed July 12, 1875.

*To all whom it may concern:*

Be it known that we, JOHN H. BROWN and JOEL G. WHITESIDE, both of St. Louis, St. Louis county, State of Missouri, have invented a certain new and useful Composition for Dressing Ladies' and Children's Shoes, of which the following is a specification:

This composition consists of glue, ten pounds; soap, ten pounds; sugar, twenty pounds; nut-galls, two and one-half pounds; prussiate of potash, twelve ounces; bichromate of potash, twelve ounces; sal-soda, nine pounds; borax, ten pounds; gum-shellac, sixty-four pounds; ox-gall, three and one-fourth pounds; gum-copal, ten pounds; extract of logwood, ten pounds; glycerine, sixteen pounds; water, sixty-four gallons.

The manner of compounding is as follows: First, make a solution of the glue, soap, and sugar with sufficient water; second, make a solution (separate from the first) of the nut-galls and prussiate and bichromate of potash with sufficient water; third, mix together first and second solutions, and raise to a temperature of 140° Fahrenheit; then add the sal-soda, borax, and gum-shellac, and stir continuously; cool to 60°; then add the ox-gall, gum-copal, and extract of logwood, and reheat to 100°; then add the glycerine gradually, continuously stirring through the whole operation. Then strain through flannel.

The glycerine, sugar, and gum-copal neutralize the effects of the alkalies on the leather, and the composition forms a preservative dressing that makes the leather soft and pliable, and gives a bright gloss that is not affected by dampness.

We claim as our invention—

The composition for dressing ladies' and children's shoes, compounded substantially as described, in about the proportions specified.

JOHN H. BROWN.
    JOEL G. WHITESIDE.

Witnesses:
 SAML. KNIGHT,
 ROBERT BURNS.